Patented Nov. 28, 1950

2,531,665

UNITED STATES PATENT OFFICE 2,531,665

MANUFACTURE OF EXPANDED THERMO-PLASTIC MATERIALS

Stanley Booth, Dedham, England, assignor to Expanded Rubber Company Limited, Croydon, England No Drawing. Application November 13, 1946, Serial No. 709,416. In Great Britain July 4, 1946

4 Claims. (Cl. 18—48)

This invention is concerned with improvements in and relating to the manufacture of expanded thermo-plastic materials, and its principal object is to provide a new and improved process for the production of rigid, light density cellular materials from thermo-plastic compositions.

By the term "thermo-plastic" materials or compositions as used in this specification is meant a material hard at room temperatures and capable of softening by heat and consisting of or comprising a thermo-plastic resin, e. g. polystyrene, poly methyl methacrylate, polyethylene and cellulose esters and ethers.

Light density cellular materials have already been made from thermo-plastic compositions by processes similar to those already known for the production of gas expanded cellular rubber materials, in which a composition of rubber is impregnated with a gas under a high pressure, generally of the order of 4,000 lbs./sq. in., after which the external pressure is released, so as to allow the internal pressure of the retained or dissolved gas to expand the material, which is thus obtained as a product having a fine uniform and cellular structure. Thus British specification No. 527,951 (Expanded Rubber Company Ltd. and Alfred Cooper) described a process for the production of expanded thermo-plastic materials by partially filling a mould with a thermo-plastic synthetic resin, sealing the mould so as to render it gas-tight, introducing gas into the mould under a high pressure and heating the mould to a temperature sufficient to soften the resin, and while it is thus softened reducing the pressure so as to allow the retained or dissolved gas to expand the material to fill the mould, and thereupon hardening the material by cooling whilst it is still supported by the mould.

The specification of a co-pending British patent application No. 3,369/42 describes a method which enables gas-tight moulds to be dispensed with according to which the thermo-plastic material is made into a stiff dough by the use of a solvent or plasticiser. The dough, preferably supported by a container is subjected to a high gas pressure in an autoclave which, if the dough is not sufficiently plastic, may be heated at about 100° C., for several hours, after which the autoclave is cooled and the gas pressure released, when the additional adiabatic cooling due to release of gas pressure causes the gas impregnated dough to become hard and rigid. On removal from the autoclave and warming to room temperature, expansion of the material occurs. In order to obtain a product of satisfactory rigidity, the thus expanded material must be suitably treated as for example by seasoning, so as to remove the solvent or plasticizer used to form the original dough.

It is an object of the present invention to provide an improved process for the production of expanded products of the kind described which does not involve the use of gas-tight moulds or the need of any seasoning or similar operation.

We have now found that thermo-plastic materials as hereinbefore defined will, if subjected to a high gas pressure in a suitable vessel, such for example as an autoclave, absorb sufficient gas for the subsequent expansion operation at moderately elevated temperatures at which the materials are considerably harder than has hitherto been considered suitable for obtaining a satisfactory gassing. It has further been found that if the gassed material is allowed to cool to room temperature whilst still under high gas pressure, the pressure may then be released and the material removed from the vessel, without expansion taking place. The expansion may conveniently be effected subsequently, by heating the gas-containing material to a temperature at which it is soft and/or elastic. As the rate of diffusion of the gas from the plastic material increases rapidly with rise of temperature, it may be found that, unless steps are taken to prevent this diffusion during the period of heating, most of the gas will have escaped by the time the material is soft enough to allow of expansion taking place and the internal pressure of the residual gas may be insufficient to cause the desired expansion.

In general, therefore, it is desirable to hold the material under pressure, whilst it is being raised to the temperature requisite for expansion, then on release of the external pressure expansion takes place to yield a multi-cellular expanded product, which on cooling retains its cell structure as a rigid, hard, light density product.

This can conveniently be done in a mould, which need not be gas-tight, or between the platens of a press, whilst the material is being raised to the requisite temperature.

According to the present invention, therefore, a process for the production of expanded thermoplastic materials comprises impregnating the said material with a gas, under high pressure, at temperatures of the order of 100 to 120° C., cooling the material while still under pressure, releasing the external gas pressure when the material is cool, and thereafter removing the material from the pressure vessel and again heating it until it is in a soft and plastic state under such conditions that any substantial escape of gas is prevented. Such escape of gas may be prevented by carrying out the heating under gas pressure or in a mould, or between the platens of a heated press. When the desired state of softness has been reached, the pressure is suddenly released and the material allowed to expand.

The present invention is distinguished from the co-pending application No. 3,369/42 above referred to in that the thermo-plastic material is employed either without a solvent or plasticiser, or the latter is employed only in such quantity as to enable the material to be shaped while retaining its rigidity at room temperature. Thus, for example, cellulose acetate, which by itself is not considered to be thermo-plastic needs some plasticiser or solvent to enable it to be softened by heating but in no case is the amount of plasticiser of the order required to form a dough at room temperatures.

In some cases, such for example as where the material is of such a nature that the rate of diffusion of the gas through the material whilst it is being heated to soften it is low, or where, as in the case of thin articles, the material can be rapidly brought to the requisite temperature, it is not necessary to maintain any external pressure, and expansion can be brought about by merely heating the material, as for example in an oven, to the requisite temperature.

In all cases the correct temperature and conditions to be employed can easily be determined by experiment.

We prefer according to the invention to treat the thermo-plastic material in the form of sheets, in which case it is sufficient, when carrying out the expansion step, to maintain a pressure on the large surfaces of the sheet, i. e. the top and the bottom.

As a further feature of the invention, we may in the case of flat sheets, conveniently employ both the top and bottom platens of a press to provide both the pressure and the heat necessary for the expansion step, when on release of the pressure, the material being at the appropriate temperature, expansion takes place.

Where a mould is employed to heat the material to the expansion temperatures, we prefer to cut the hard gas impregnated material to the internal size of the mould, and to fill the mould with it. In this case, when the external pressure is released, with the material at the requisite temperature, the latter usually springs out of the mould, and expands in all three directions.

The term "gas" as used herein means either air or any inert gas, such for example as nitrogen or carbon dioxide. We prefer to use nitrogen.

The pressures employed for the gas impregnating stage may vary between wide limits. In general we prefer to operate under pressures of the order of 4,000 lbs./sq. inch, but we may use pressures varying from a few atmospheres up to 10,000 lbs. or more depending upon the practical difficulties of using such high pressures.

We have found that the pressure employed during the gas impregnation stage to a considerable extent determines the final density of the expanded material which will be lower the higher the impregnating pressure was.

The following examples of how the invention may be carried into effect, are given only by way of illustration:

Example I

A sheet of polystyrene, ¼" thick, was moulded at a temperature of 150° C. under a pressure of one ton per square inch. The polystyrene was a commercial polymer sold under the registered trade-mark "Distrene" and contained neither plasticiser nor solvent.

The sheet was placed in a steam jacketed high pressure autoclave, the steam pressure in the jacket being maintained at 25 lbs. per square inch, giving a temperature of approximately 125° C. Nitrogen gas was admitted into the autoclave at a pressure of 4,000 lbs. per square inch and the pressure maintained for four hours. At the end of this period, the autoclave was cooled, the gas pressure released and the apparently unchanged sheet of polystyrene removed. The sheet was then placed in a frame mould between the platens of a press, pressure applied (1,000 lbs. per square inch) and the press platens heated to a temperature of 150° C. by means of high pressure steam. At the end of five minutes, the upper press platen was raised when sudden expansion of the polystyrene occurred. On cooling the platens by circulating cold water, the expanded polystyrene became hard and rigid. The product had a fine cellular structure and a density of 12 lbs. per cubic foot.

Example II

A sheet of cellulose acetate was prepared, having the composition 100 parts cellulose acetate and 10 parts dimethyl phthalate, by what is known as the Celluloid technique, that is, a dough of the material was prepared, using a methyl ethyl ketone/alcohol solvent mixture and a block pressed from the dough. ¼" thick sheets were sliced and the sliced sheets seasoned at a temperature of 70° C. for several days to remove solvent. The hard rigid sheet thus obtained, having a residual solvent content of less than 1% was placed in a steam heated autoclave and nitrogen was admitted at a pressure of 4,000 lbs. per square inch. The pressure was maintained six hours, the steam pressure in the autoclave jacket being 10 lbs. per square inch (approx. 110° C.). The autoclave was cooled, the gas pressure released and the apparently unchanged material removed from the autoclave. The sheet was placed in a frame mould between the platens of a press and heated for five minutes at a temperature of 150° C. under a pressure of 1,000 lbs. per square inch. On releasing the pressure, the sample slowly rose out of the mould, which was bevelled to assist this, and expanded. On cooling, the material, a hard, rigid board was obtained having a density of 6 lbs. per cubic foot, a compression strength of over 100 lbs. per square inch. The softening point of this material, when measured by a modified Marten's test, was 165° C. This was the temperature at which a deflection of ½" was obtained when a bar ½" thick, 1" wide and 6" long was subjected to a load of 1.5 lbs. at its centre, the ends of the bar being supported on knife edges.

Example III

A sheet of cellulose acetate of the above composition was treated exactly as in Example II but the final expansion process was carried out between the platens of the press without the use of a mould. Good expansion was obtained but the final board was not quite as regular in shape as when using the mould.

What I claim is:

1. A process for the production of an expanded thermoplastic material which comprises submitting the material selected from the group consisting of polystyrene, polymethylmethacrylate, polyethylene, and cellulose esters and ethers at a temperature of the order of 100 to 125° C. to impregnation with an inert gas under pressure without the aid of a volatile solvent and cooling the material until rigid before releasing the pressure, then heating the material to the plastic state in a sufficiently confined space to prevent any substantial expansion of the material from the absorbed gas, and consequently to prevent any cell formation during the heating up, and when the material is plastic throughout suddenly releasing it from confinement and rapidly cooling the expanded product.

2. A process as claimed in claim 1, wherein the impregnation is effected at a pressure of at least 4,000 lbs. per square inch.

3. A process for the production of expanded polystyrene which comprises heating the same at a temperature of approximately 125° C. in an atmosphere of nitrogen at a pressure of at least 4,000 lbs. per square inch until the desired permeation has been attained without the aid of a volatile solvent, cooling the material until rigid before releasing the pressure, and then heating the material to the plastic state in a space sufficiently confined to prevent any substantial expansion of the material from the absorbed gas and consequently prevent any cell formation during the heating up and when the material is plastic throughout suddenly releasing it from confinement and rapidly cooling the expanded product.

4. A process for the production of expanded cellulose acetate which comprises heating the same at a temperature of approximately 125° C. in an atmosphere of nitrogen at a pressure of at least 4,000 lbs. per square inch until the desired permeation has been attained without the aid of a voltaile solvent, cooling the material until rigid before releasing the pressure, and then heating the material to the plastic state in a space sufficiently confined to prevent any substantial expansion of the material from the absorbed gas and consequently prevent any cell formation during the heating up and when the material is plastic throughout suddenly releasing it from confinement and rapidly cooling the expanded product.

STANLEY BOOTH.

REFERENCES CITED

The following references are of record in the file of this patent:

UNITED STATES PATENTS

| Number | Name | Date |
|---|---|---|
| 1,905,269 | Denton | Apr. 25, 1933 |
| 2,156,508 | Minor | May 2, 1939 |
| 2,268,160 | Miles | Dec. 30, 1941 |
| 2,405,345 | Cooper | Aug. 6, 1946 |